United States Patent [19]

Delgado et al.

[11] Patent Number: 5,266,402
[45] Date of Patent: Nov. 30, 1993

[54] INTERPENETRATING PRESSURE-SENSITIVE ADHESIVE POLYMER NETWORKS

[75] Inventors: Joaquin Delgado; Spencer F. Silver; Margaret M. Sheridan, all of Ramsey, Minn.

[73] Assignee: Minnesota Mining and Manufacturing Company, St. Paul, Minn.

[21] Appl. No.: 629,519

[22] Filed: Dec. 18, 1990

[51] Int. Cl.⁵ ................................................ C09J 7/02
[52] U.S. Cl. ..................................... 428/355; 525/193; 525/223; 525/226; 525/903
[58] Field of Search ................ 428/355; 525/193, 223, 525/226, 903

[56] References Cited

U.S. PATENT DOCUMENTS

| | | | |
|---|---|---|---|
| Re. 24,906 | 12/1960 | Ulrich | 206/59 |
| 3,833,404 | 9/1974 | Sperling et al. | 117/63 |
| 4,181,752 | 1/1980 | Martens et al. | 427/54.1 |
| 4,223,067 | 9/1980 | Levens | 428/308 |
| 4,243,500 | 1/1981 | Glennon | 204/159 |
| 4,302,553 | 11/1981 | Frisch et al. | 525/28 |
| 4,396,377 | 8/1983 | Roemer et al. | 433/199 |
| 4,396,476 | 8/1983 | Roemer et al. | 204/159.16 |
| 4,551,486 | 11/1985 | Tateosian et al. | 523/212 |
| 4,612,242 | 9/1986 | Vesley et al. | 428/313.9 |
| 4,616,057 | 10/1986 | Lindemann et al. | 524/458 |
| 4,666,771 | 5/1987 | Vesley et al. | 428/325 |
| 4,698,373 | 10/1987 | Tateosian et al. | 522/95 |
| 4,711,913 | 12/1987 | Tateosian et al. | 522/14 |
| 4,748,061 | 5/1988 | Vesley | 428/40 |
| 4,855,170 | 8/1989 | Darvell et al. | 428/40 |
| 4,931,347 | 6/1990 | Slovinsky et al. | 428/192 |

FOREIGN PATENT DOCUMENTS

WO89/00106  1/1989  PCT Int'l Appl. .

*Primary Examiner*—Jenna L. Davis
*Attorney, Agent, or Firm*—Gary L. Griswold; Walter N. Kirn; Robert W. Sprague

[57] ABSTRACT

A pressure-sensitive adhesive comprising an acrylate matrix, and swellable, infusible, insoluble, elastomeric acrylate microspheres, each of the microspheres having discrete boundaries, the microspheres and the matrix forming an interpenetrating polymer network within the boundaries of the microspheres.

17 Claims, No Drawings

INTERPENETRATING PRESSURE-SENSITIVE ADHESIVE POLYMER NETWORKS

FIELD OF THE INVENTION

This invention relates to acrylate pressure-sensitive adhesive systems which form an interpenetrating polymer network within the boundaries of swellable, infusible acrylate microspheres.

BACKGROUND OF THE INVENTION

Acrylate pressure-sensitive adhesives have been well known in the art. In U.S. Pat. No. 24,906 (Ulrich), alkyl acrylate copolymers are described which are predominately alkyl esters of acrylic acid having from 4 to 14 carbon atoms, and further comprise a minor amount (3–12%, preferably 4–8%) of a polar copolymerizable monomer such as acrylic acid. Such adhesives are widely popular as they are readily available and provide a good balance of tack, shear and peel properties on a variety of substrates at a relatively low cost.

These adhesives have a wide variety of uses in which high performance is required, including automotive, industrial and consumer applications.

U.S. Pat. No. 4,181,752 (Martens et al) discloses a process for ultraviolet photopolymerization of alkyl acrylate esters and polar copolymerizable monomers to form the acrylate copolymer. Martens teaches that intensity and spectral distribution of the irradiation must be controlled in order to attain desirable cohesive strengths and peel resistance. The photopolymerization is preferably carried out in an inert atmosphere as oxygen tends to inhibit the reaction. Adhesive properties for tapes made via the Martens process are improved over those made by solution polymerization.

Many fillers, including various types of microbubbles have been used in acrylate adhesives. U.S. Pat. No. 4,931,347 (Slovinsky et al.) discloses a pressure-sensitive adhesive matrix containing particulate solids wherein the adhesive system has a light transmission of 15–80 percent. The particles have an average size no greater than $300\mu$. Acrylic acid ester monomers are disclosed as preferred for the adhesive matrix. Preferred particles are polymers derived from ethylenically-unsaturated monomers. UV-initiated polymerization of the adhesive is disclosed.

U.S. Pat. No. 4,243,500, (Glennon), discloses a pressure-sensitive adhesive formed from a composition comprising at least one monofunctional unsaturated acrylate ester monomer, a saturated tackifying resin polymer, a non-crystallizing elastomeric material, and an initiator responsive to ultraviolet light or other radiation The intensity of the lamps to which the adhesive is exposed is much higher than that of the lamps disclosed in Martens et al. The elastomer used is soluble in the acrylate ester, and therefore cannot form an interpenetrating polymer network (IPN) within the system.

U.S. Pat. No. 4,223,067 (Levens) discloses an acrylic foam-like pressure-sensitive adhesive containing clear glass microbubbles. U.S. Pat. No. 4,612,242, (Vesley et al.), U.S. Pat. No. 4,748,061 (Vesley), U.S. Pat. No. 4,666,771, (Vesley et al.), also disclose acrylic pressure-sensitive adhesives containing various types of colored coated glass microbubbles which yield a dark pressure-sensitive foam-like adhesive. Levens and Vesley provide pressure-sensitive adhesives having low tack and which are translucent or opaque, requiring the use of pigments when it is desired to render the adhesive layer less visible when placed in contact with a painted surface. Furthermore, fillers and/or prepolymerization is necessary to provide coatable compositions, especially, when very thick constructions are desired.

Continuous IPN's are described in U.S. Pat. No. 4,302,553 (Frisch et al.). The IPNs are composed of chemically dissimilar crosslinking polymer chains having substantially no chemical bonding between dissimilar chemical chains, but rather, the dissimilar chains are physically entangled, as fibers in a cloth, by permanent chain entanglements. Utility as resins for the preparation of films, elastomers, adhesives, coatings, and the like is disclosed.

U.S. Pat. No. 3,833,404 (Sperling et al.) describes a damping means for a vibratory or noise-emitting part or surface comprising an inner layer or coating of viscoelastic material and an outer plastic constraining layer. The viscoelastic material is comprised of a continuous IPN consisting essentially of 5–95% by weight of crosslinked plastic and 95–5% of crosslinked elastomer.

U.S. Pat. No. 4,616,057 (Lindemann et al.) discloses a process for preparing polymer emulsions-containing IPNs. The polymer emulsions are useful as binders, adhesives, and coatings. When the polymer emulsion is subsequently applied, dried, and heated, the physical and chemical boding of the two polymer networks is completed.

U.S. Pat. Nos. 4,396,476 and 4,396,377 (Roemer et al.) and U.S. Pat. Nos. 4,551,486, 4,698,373 and 4,711,913 (Tateosian et al.) describe dental compositions hardenable by exposure to heat or electromagnetic radiation. The composition, in general comprise crosslinked polymer in the form of discrete particles, polymerizable monomer, and crosslinking agent. Crosslinking oligomers are sometimes utilized. A discontinuous IPN structure is thought to be formed and is superior grind resistance, of the hardened dental compositions.

U.S. Pat. No. 4,855,170, (Darvell et al.) discloses a sheet material coated with a layer of pressure-sensitive adhesive containing and completely surrounding resilient non-tacky hollow polymeric microspheres which is disclosed to yield a removable and repositionable product. However, no IPN is formed within the boundaries of the microspheres since the matrix does not extend through the microspheres themselves.

WO 89/00106 (Avery) discloses an extruded pressure-sensitive adhesive comprising a carrier layer comprising an electron beam cured pressure-sensitive adhesive matrix, 10–20% by volume low density microspheres, and at least one pigment. The curable matrix comprises one or more monomers which have been previously polymerized. The solvent mixture of polymer, microsphere, pigment, etc., is fed through an extruder such that less than about 2% by volume of volatiles remains in the extrudate. The extruded film is then cured by electron beam radiation. It is further disclosed that UV-radiation is not suitable for curing of the tape as pigment is contained in the matrix. The matrix does not extend through the micro-sphere walls therfore no IPN can be formed.

In view of the foregoing, it is an object of this invention to provide an acrylate pressure-sensitive adhesive which exhibits the high performance characteristics of filled systems while providing the advantages of optical transparency and excellent pressure-sensitive tack.

It is also an object of this invention to provide a composition, curable to an acrylate pressure-sensitive adhesive, having enhanced coating rheology without the need for a prepolymerization step, added polymer, or addition of other rheology modifiers.

It has been discovered that these and other objects and advantages which will become apparent from the description below can be achieved by preparing acrylate pressure-sensitive adhesives containing IPNs within the boundaries of dispersed, swellable, acrylate, elastomeric microspheres.

SUMMARY OF THE INVENTION

The pressure-sensitive adhesives of the present invention comprise an acrylate matrix, and swellable, infusible, insoluble, elastomeric, acrylate microspheres, each of said microspheres having discrete boundaries, the microspheres and the matrix forming an interpenetrating polymer network within the boundaries of the microspheres.

Preferred pressure-sensitive adhesives of the invention include in the matrix at least one alkyl acrylate ester of a non-tertiary alcohol, the alkyl group having an average of from about 4 to about 12 carbon atoms. The matrix may also include one or more polar copolymerizable monomers. Preferred microspheres also comprise at least one alkyl acrylate ester of a nontertiary alcohol.

Useful microspheres include tacky and nontacky microspheres which show some degree of swelling when contacted with monomer.

When used herein, the ensuing terms have the following meanings.
1. The terms "boundary" and "boundaries" mean the outside limits of the microspheres' polymeric structure.
2. The term "droplet" means the liquid stage of the microspheres prior to the completion of polymerization.
3. The term "cavity" means a space within the walls of a droplet or microsphere when still in the suspension or dispersion medium prior to drying, and thus containing whatever medium was used.
4. The term "void" means an empty space completely within the walls of a polymerized microsphere.
5. The term "hollow" means containing at least one void or cavity.
6. The term "microbubble" is used interchangeably with the term "microsphere", both of which mean a swellable, elastomeric sphere which may or may not have an internal void.
7. The term "interpenetrating polymer network" means a polymer structure where two polymer networks or a polymer network and a linear or branched polymer penetrate each other at the molecular level.
8. The term "equivalent weight" means the molecular weight divided by the functionality of the crosslinking monomer.

All weights, parts, and ratios herein are by weight unless specifically stated otherwise.

DETAILED DISCLOSURE OF THE INVENTION

Compositions useful as matrices in pressure-sensitive adhesives of the invention are free radically polymerizable acrylate pressure-sensitive adhesive compositions. These acrylates are typically alkyl acrylates, preferably monofunctional unsaturated acrylate esters of non-tertiary alkyl alcohols, the alkyl groups of which have from 1 to about 14 carbon atoms. Included with this class of monomers are, for example, isooctyl acrylate, isononyl acrylate, 2-ethyl-hexyl acrylate, decyl acrylate, dodecyl acrylate, n-butyl acrylate, and hexyl acrylate.

Preferred monomers include isooctyl acrylate, isononyl acrylate, 2-ethylhexyl acrylate, and butyl acrylate. The alkyl acrylate monomers can be used to form homopolymers or they can be copolymerized with polar copolymerizable monomers. When copolymerized with strongly polar monomers, the alkyl acrylate monomer generally comprises at least about 75% of the polymerizable monomer composition. When copolymerized with moderately polar monomers, the alkyl acrylate monomer generally comprises at least about 70% of the polymerizable monomer composition.

The polar copolymerizable monomers can be selected form strongly polar monomers such as monoolefininc mono- and dicarboxylic acids, hydroxyalkyl acrylates, cyanoalkyl acrylates, acrylamides or substituted acrylamides, or from moderately polar monomers such as N-vinyl pyrrolidone, acrylonitrile, vinyl chloride or diallyl phthalate. The strongly polar monomer preferably comprises up to about 25%, more preferably up to about 15%, of the polymerizable monomer composition. The moderately polar monomer preferably comprises up to about 30%, more preferably from about 5% to about 30% of the polymerizable monomer composition.

The pressure-sensitive adhesive matrix of the invention also contains initiator to aid in polymerization of the monomers. Suitable initiators include thermally-activated initiators such as azo compounds, hydroperoxides, peroxides, and the like, and photoinitiators such as the benzoin ethers, substituted benzoin ethers such as benzoin methyl ether or benzoin isopropyl ether, substituted acetophenones such as 2,2-diethoxyacetophenone, and 2,2-dimethoxy-2-phenyl-acetophenone, substituted alpha-ketols such as 2-methyl-2-hydroxypropiophenone, aromatic sulphonyl chlorides such as 2-naphthalene sulphonyl chloride, and photoactive oximes such as 1-phenyl-1,1-propanedione-2-(O-ehoxycarbonyl) oxime. Generally, the initiator is present in an amount of from about 0.01 part to about 3.0 parts based on 100 parts monomer weight.

Where superior cohesive strengths are desired, the pressure-sensitive adhesive matrix may also be crosslinked. Preferred crosslinking agents for the acrylic pressure-sensitive adhesive matrix are multiacrylates such as 1,6-hexanediol diacrylate as well as those disclosed in U.S. Pat. No. 4,379,201 (Heilmann et al.), incorporated herein by reference. Other types of crosslinking agents are also useful, e.g., any of those taught in U.S. Pat. No. 4,330,590 (Vesley), and U.S. Pat. No. 4,329,384 (Vesley et al.), both of which are incorporated by reference. Each of the crosslinking agents is useful in the range of from about 0.01% t o about 1% of the total weight of the monomers.

Other useful materials which can be blended into the matrix include, but are not limited to, fillers, pigments, plasticizers, tackifiers, fibrous reinforcing agents, woven and nonwoven fabrics, foaming agents, antioxidants, stabilizers, fire retardants, and rheological modifiers.

One useful filler material is hydrophobic silica as disclosed in U.S. Pat. Nos. 4,710,536 and 4,749,590, (Klingen et al.), both of which are incorporated herein by reference. In one preferred embodiment of the present invention, the pressure-sensitive adhesive further comprises from about 2 to about 15 phr of a hydrophobic silica having a surface area of at least 10 $m^2/g$.

The swellable, elastomeric microspheres useful in compositions of the invention likewise comprise primarily acrylic copolymers as described above. It is believed that an interpenetrating polymer network (IPN) is formed within the boundaries of the microspheres, with the acrylic matrix being continuous therein. The IPN exhibits a characteristic two-phase structure wherein the matrix component exists as a continuous phase, inside and outside the elastomeric microsphere.

Microspheres useful in compositions of the invention include any elastomeric microspheres which show some degree of swelling when contacted with monomer. Such elastomeric microspheres may be tacky, as disclosed in U.S. Pat. No. 3,691,140, (Silver), incorporated herein by reference, or nontacky.

The advantages provided by IPN pressure-sensitive adhesives include optical transparency, improved low temperature damping properties, improved die cutability, non-raspy peel behavior, and increased tack. The level of peel adhesion can be adjusted by varying the thickness of the matrix relative to the diameter of the microspheres used.

Elastomeric microspheres useful in the invention may be made by any of the conventional processes, including but no limited to those processes described in U.S. Pat. Nos. 4,166,152, 495,318, 4,598,112, 4,810,763 and DE 3,544,882, all of which are incorporated herein by reference.

A preferred process of making microspheres useful herein is an aqueous suspension polymerization technique utilizing ionic or non-ionic emulsifiers in an amount greater than the critical micelle concentration and/or protective colloids, finely divided inorganic solids, or the like. The critical micelle concentration is here defined as the minimum concentration of emulsifier necessary for the formation of micelles. Critical micelle concentration is slightly different for each emulsifier, usable concentrations ranging from about $1.0 \times 10^{-4}$ to about 3.0 moles/liter. Initiators for polymerizing the monomers to provide the spheres of the invention are those which are normally suitable for free-radical polymerization of acrylate monomers and which are oil-soluble and of very low solubility in water such as, for example, benzoyl peroxide. Use of a water-soluble catalyst causes formation of substantial amounts of latex, the extremely small size and solubility of latex particles being undesirable. Concentration of initiator will affect microsphere quality and, therefore, should be on the order of about 0.1 to about 1.0 percent by weight, of the total photopolymerizable composition, preferably about 0.25 to about 0.5 percent.

Following polymerization, an aqueous suspension of the microspheres is obtained which is stable to agglomeration or coagulation under room temperature conditions. The suspension may have non-volatile solids contents of from about 10 to about 75 percent by weight. Upon prolonged standing, the suspension separates into two phases, one phase being aqueous and substantially free of polymer, the other phase being an aqueous suspension of microspheres.

Aqueous suspensions of hollow microspheres useful herein may be prepared by a "two-step" emulsification process which first involves forming a water-in-oil emulsion of an aqueous solution of polar monomers in oil phase monomer, i.e., at least one acrylate or methacrylate ester, using an emulsifier having a low hydrophilic-lipophilic balance (HLB) value. Where it is desirable not to include a polar monomer, water may be mixed directly with the oil phase monomer, i.e., acrylate or methacrylate ester, and emulsifier to form the water-in-oil emulsion. Suitable emulsifiers are those having an HLB value below about 7, preferably in the range of about 2 to about 7. Examples of such emulsifiers include sorbitan monoleate, sorbitan trioleaste, and ethoxylated oleyl alcohol such as Brij TM 93, available from Atlas Chemical Industries, Inc. Thus, in this first step, oil phase monomer(s), emulsifier, a free radical initiator, and, optionally, a crosslinking monomer or monomers as defined below are combined, and an aqueous solution of all or a portion of the polar monomer(s) is agitated and poured into the oil phase mixture to form a water-in-oil emulsion. A thickening agent, e.g., methyl cellulose may also be included in the aqueous phase of the water-in-oil emulsion. In the second step, a water-in-oil-in-water emulsion is formed by dispersing the water-in-oil emulsion of the first step into an aqueous phase containing an emulsifier having an HLB value above about 6. The aqueous phase may also contain any portion of the polar monomer(s) which was not added in step one. Examples of such emulsifiers include ethoxylated sorbitan monooleate, ethoxylated lauryl alcohol, and alkyl sulfates, In both steps, when an emulsifier is utilized, its concentration should be greater than its critical micelle concentration, which is herein defined as the minimum concentration of emulsifier necessary for the formation of micelles, i.e., submicroscopic aggregations of emulsifier molecules. Critical micelle concentration is slightly different for each emulsifier, usable concentrations ranging from about $1.0 \times 10^{-4}$ to about 3.0 moles/liter. Additional detail concerning the preparation of Water-in-oil-in-water emulsions, i.e., multiple emulsions, may be found in various literature references, e.g., *Surfactant Systems: Their Chemistry, Pharmacy, & Biology*, (D. Attwood and A. T. Florence, Chapman & Hall Limited, New York, N.Y., 1983). The final process step of this method of the invention involves the application of heat or radiation to initiate polymerization of the monomers. Suitable initiators are those which are normally suitable for free radical polymerization of acrylate monomers and which are oil-soluble and of very low solubility in water. Examples of such initiators include thermally-activated initiators such as azo compounds, hydroperoxides, peroxides, and the like, and photoinitiators such as benzophenone, benzoin ethyl ether, and 2,2-dimethoxy-2-phenyl acetophenone. Use of a water-soluble polymerization initiator causes formation of substantial amounts of latex. The extremely small particle size of latex particles renders any significant formation of latex undesirable. The initiator is generally used in an amount ranging from about 0.01 percent up to about 10 percent by weight of the total polymerizable composition, preferably up to about 5 percent.

Aqueous suspensions of hollow microspheres which contain moderately ionized polar monomer(s) may also be prepared by a "one-step" emulsification process comprising aqueous suspension polymerization of at least one alkyl acrylate or alkyl methacrylate ester monomer and at least one moderately ionized polar monomer in the presence of at least one emulsifier capable of producing a water-in-oil emulsion inside the droplets which is substantially stable during emulsification and polymerization. As in the two-step emulsification process, the emulsifier is utilize din concentrations greater than its critical micelle concentration. In general, high HLB emulsifiers are required, i.e., emulsifiers having an HLB value of at least about 25, will produce stable cavity-containing droplets during the polymerization, and are suitable for use in this one-step process. Examples of such emulsifiers include alkylarylether sulfates such as sodium alkylarylether sulfate, e.g., Trinton ™ W/30, available from Rohm and Haas, alkylarylpolyether sulfates such as alkylarypoly(ethylene oxide) sulfates, preferably those having up to about 4 ethyleneoxy units. Alkyl sulfates, alkyl ether sulfates, and alkylarylether sulfates are preferred as they provide a maximum void volume per microsphere for a minimum amount of surfactant. Polymeric stabilizers may also be present but are not necessary.

The hollow microspheres made by this process are normally tacky, elastomeric, insoluble but swellable in organic solvents, and small, typically having diameters of at least 1 micrometer, preferably in the range of about 1 to about 250 micrometers. The voids typically range in size up to about 100 micrometers or larger.

Following polymerization, an aqueous suspension of the hollow microspheres is obtained which is stable to agglomeration or coagulation under room temperature conditions. The suspension may have non-volatile solids contents of from about 10 to about 50 percent by weight. Upon prolonged standing, the suspension separates into two phases, one phase being aqueous and substantially free of polymer, the other phase being an aqueous suspension of microspheres having at least on cavity, which, upon drying, becomes a void. Both phases may contain a minor portion of small latex particles. Decantation of the microsphere-rich phase provides an aqueous suspension having a non-volatile solids content on the order of about 40–50 percent which, if shaken with water, will readily redisperse.

The microsphere composition prepared by any of the above-mentioned methods may also contain a crosslinking agent such as a multifunctional (meth)acrylate, e.g., butanediol diacrylate or hexanediol diacrylate, or other multifunctional crosslinker such as divinylbenzene. When utilized crosslinker(s) is (are) added at a level of up to about 1.0 percent, preferably up to about 0.5 percent, of the total polymerizable composition.

The pressure-sensitive adhesive compositions of the invention are preferably made by mixing from about 1% to about 85% by volume of the elastomeric microspheres into the alkyl acrylate monomer, and then adding the polar copolymerizable monomer, and initiator. Optional crosslinking agent, solvent, or other additives may also be incorporated into the dispersion.

This composition is coated onto a flexible carrier web and polymerized in an inert, i.e., oxygen free, atmosphere, e.g., a nitrogen atmosphere. A sufficiently inert atmosphere can be achieved by covering a layer of the photoactive coating with a plastic film which is substantially transparent to ultraviolet radiation, and irradiating through that film in air using fluorescent-type ultraviolet lamps. If, instead of covering the polymerizable coating, the photopolymerization is to be carried out in an inert atmosphere, the permissible oxygen content of the inert atmosphere can be increased by mixing into the polymerizable monomer an oxidizable tin compound as taught in U.S. Pat. No. 4,303,485 (Levens), incorporated herein by reference, which also teaches that such procedures will allow thick coatings to be polymerized in air. Alternatively, the dispersion can be either thermally or photopolymerized according to conventional bulk or solution polymerization techniques. The polymerization may optionally be carried out in an extruder using thermal initiator, e.g., as described in U.S. Pat No. 4,619,979 (Kotnour et al). These and other aspects of the invention are illustrated by the following examples which should not be viewed as limiting in scope.

TEST METHODS

Peel Adhesion

Peel adhesion is the force required to remove a coated flexible sheet material from a test panel measured at a specific angle and rate of removal. In the examples, this force is expressed in grams per centimeter (cm) width of coated sheet. The procedure followed is:

A strip 1.27 cm in width of the coated sheet is applied to the horizontal surface of a clean glass test plate with at least 12.7 lineal cm in firm contact. A 2 kg hard rubber roller is used to apply the strip. The free end of the coated strip is doubled back nearly touching itself so the angle of removal will be 180°. The free end is attached to the adhesion tester scale. The glass test plate is clamped in the jaws of a tensile testing machine which is capable of moving the plate away from the scale at a constant rate of 2.3 meters per minute. The scale reading in grams is recorded as the tape is peeled from the glass surface. The data is reported as the average of the range of numbers observed during the test.

Shear Strength

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in minutes required to pull a standard area of adhesive coated sheet material from a stainless steel test panel under stress of a constant, standard load.

The tests were conducted on strips of coated sheet material applied to a stainless steel panel such that a 1.27 cm by 1.27 cm portion of each strip was in firm contact with the panel with one end portion of the tape being free. The panel with the coated strip attached was held in a rack such that the panel formed an angle of 178° with the extended tape free end which was tensioned by application of a force of 1 kilogram applied as a hanging weight from the free end of the coated strip. the 2° less than 180° is used to negate any peel forces, thus insuring that only the shear forces are measured, in an attempt to more accurately determine the holding power of the tape being tested. The time elapsed for each coated film to separate from the test panel was recorded as the shear strength.

Tack

The tack of the pressure-sensitive adhesives of the invention is tested according to the following procedure. A Polychem Probe Tack Tester ™ is inserted. into the adhesive to be tested at a 100 gram load setting. The sample is allowed to dwell, typically for 1 second, and the probe is withdrawn. The withdrawal rate of the probe is set for either 0.5 cm/sec or 1.0 cm/sec, as specified.

Glossary

LMA = Lauryl acrylate
INA = isononyl acrylate
MBA = 2-Methylbutyl acrylate

AmA=Ammonium acrylate
BDA=Butanediol diacrylate
IOA=Isooctyl acrylate
AA=Acrylic acid
HDDA=1,6-hexanediol diacrylate Preparation of Microspheres A In a one-liter resin reactor equipped with mechanical stirrer, condensor, and inlet-outlet lines for vacuum and argon, 450 grams of deionized water, 144 grams of isooctyl acrylate, 6 grams of acrylic acid and 0.5 gram of benzoyl peroxide were charged. Vacuum was applied to evacuate the reactor atmosphere, and the reactor was then purged with argon. The agitation was set to 400 rpm and when the initiator had dissolved, 1.5 grams of ammonium lauryl sulfate were added. The temperature of the reactor was raised to 60° C. and maintained during the polymerization. After the 22-hour period, the suspension was allowed to cool to room temperature. The reactor was emptied and the suspension filtered. Optical microscopy revealed hollow microspheres having diameters of from about 4 to 90 micrometers suspended in water. The majority of the microspheres contained a central (cavity) having a cavity diameter of at least 30% of the diameter of the microspheres. The suspension was coagulated and the microspheres dried in a vacuum oven.

Preparation of Microspheres B-J

Microspheres B to J were prepared according to the procedure described for microspheres A except that the monomer charges indicated in Table I were used. For microspheres F, 0.5 gram of Vazo ™ 52 (DuPont) initiator was used instead of benzoyl peroxide. The diameter indicated in Table 1 represent the volume average diameter range of the microspheres.

TABLE 1

| Microsphere | Monomer composition | | Diameter (microns) |
|---|---|---|---|
| B | 141 g | isooctyl acrylate | 40-60 |
|   | 9 g. | acrylic acid | |
| C | 147 g. | isooctyl acrylate | 40-60 |
|   | 3 g. | methacrylic acid | |
| D | 144 g | isooctyl acrylate | 40-60 |
|   | 6 g. | methacrylic acid | |
| E | 127.5 g. | isooctyl acrylate | 55-80 |
|   | 22.5 g. | N-vinyl,2-pyrrolidone | |
|   | 0.04 g | butanediol diacrylate | |
| F | 141 g | isooctyl acrylate | 50-70 |
|   | 9 g. | dimethylaminoethyl methacrylate | |
|   | 0.04 g | 1-6 hexamethylene diacrylate | |
| G | 142.5 g. | isooctyl acrylate | 40-60 |
|   | 7.5 | acrylamide | |
| H | 135 g. | isooctyl acrylate | 40-60 |
|   | 15 g. | acrylic acid | |
| I | 135 g. | isooctyl acrylate | 55-80 |
|   | 15 g. | N-vinyl,2-pyrrolidone | |
|   | 0.04 g. | butanediol diacrylate | |
| J | 141 g. | isooctyl acrylate | 40-60 |
|   | 9 g. | acrylic acid | |
|   | 0.04 | butanediol diacrylate | |

Preparation of Microspheres K illustrates the making of low to moderate crosslink density microsphers.

A 2-liter resin flask was charged with 900 ml of deionized water and 6.0 g acrylic acid. The mixture was stirred and neutralized to pH 7.0 with concentrated ammonium hydroxide. Isooctyl acrylate, 293.85 g, 0.15 g 1,4-butanediol diacrylate ($1.53 \times 10^{-3}$ equivalent wt %) and 1.42 g Luciodol 70 were added and the contents purged with argon three times. Standapol A, 12.0 g, was added and the polymerization mixture purged once more with argon. Heated to 60° C. with stirring at about 400 rpm for 20 hours. The suspension was cooled to room temperature and the polymer recovered by precipitation with excess isopropyl alcohol, filtration and drying in a vacuum oven overnight. Microspheres with average particle diameter of 50.6 microns were obtained.

In a similar manner microspheres with different 1,4-butanediol diacrylate (BDA) content were prepared.

| Microsphere | BDA (wgt %) | Av. Particle Size |
|---|---|---|
| K | 0.00 | 32.5 microns |
| L | 0.025 | 47.9 microns |
| M | 0.10 | 39.5 microns |
| N | 0.50 | 49.6 microns |
| O | 1.00 | 60.5 microns |
| P | 2.00 | 35.4 microns |
| Q | 4.00 | 41.8 microns |

EXAMPLE 1-10

The following examples illustrate the range of peel adhesions, tack and shear values obtained by formulating different pressure-sensitive adhesives systems which form interpenetrating polymer networks within the boundaries of hollow microspheres of different composition.

The pressure-sensitive adhesives of examples 1 to 9 were prepared by dispersing in an Omni ® mixer 5 phr of the dried microspheres with the composition shown below in 85.5 phr isooctyl acrylate and 9.5 phr acrylic acid monomer mixture containing 0.055 phr hexanediol diacrylate. Next, 0.25 phr of Irgacure 651 photoinitiator was added to the microsphere dispersion. The microsphere dispersions were degassed by pulling vacuum and purging with argon. The dispersions were coated between a release liner and a poly(ethylene terephthalate) film and irradiated with UV light for 7 minutes to form the pressure-sensitive adhesive IPN. The pressure-sensitive adhesive composition of example 10 was prepared as described for examples 1 to 9. The dried hollow microspheres had a composition of 94:6:0.025 isooctyl acrylate:acrylic acid:butanediol diacrylate. 5 phr of the microspheres were dispersed in 71.25 phr of isooctyl acrylate and 23.75 phr of N-vinyl-2-pyrrolidone monomer mixture, also containing 0.055 phr of 1,6-hexanediol diacrylate and 0.25 phr of Irgacure ™ 651 photoinitiator. The microsphere dispersion was coated and irradiated with ultraviolet light as described in Examples 1-10. The pressure-sensitive adhesives were conditioned overnight in a constant temperature (21° C.) and humidity (50% relative humidity) room and tested. Table 2 shows the results obtained.

TABLE 2

| Example | Microsphere composition | Adhesive thickness (mils) | Peel Adhesion (oz/0.5") | Tack* (grams) | Shear (minutes) |
|---|---|---|---|---|---|
| 1 | A | 5.8 | 53.0 | 991 | >10,000 |
| 2 | B | 5.3 | 61.7 | 1,018 | >10,000 |
| 3 | C | 5.8 | 68.0 | 1,093 | >10,000 |
| 4 | D | 5.8 | 64.8 | 1,019 | >10,000 |
| 5 | E | 5.0 | 63.7 | NM | 6,518 |
| 6 | F | 5.0 | 49.1 | NM | 4,683 |
| 7 | G | 5.5 | 62.5 | NM | 3,800 |
| 8 | H | 5.3 | 59.4 | 1,028 | 2,607 |

TABLE 2-continued

| Example | Microsphere composition | Adhesive thickness (mils) | Peel Adhesion (oz/0.5") | Tack* (grams) | Shear (minutes) |
|---|---|---|---|---|---|
| 9 | I | 5.5 | 71.8 | 1,050 | 1,918 |
| 10 | J | 5.5 | 65.3 | 1,103 | >10,000 |

*0.5 cm/sec probe withdrawal rate

EXAMPLES 11 to 16

The following examples were made with microspheres containing various levels (wgt %) of BDA. These examples illustrate the effect of crosslink density of the microspheres of IPN pressure-sensitive adhesives. The microspheres were prepared as described for "microspheres K", except that a Gifford-Wood mixer was used in place of the Omni TM mixer. The composition of the pressure-sensitive adhesive matrix contained 87.5/12.5 IOA/AA, 0.25 phr Irgacure 651, 0.055 phr HDDA, and 8% w/w microspheres, and was prepared as described for Examples 1–10. The composition of the microspheres was IOA/AmA/BDA wherein the ratio of ingredients was 98/2/BDA, with the amount of the BDA being varied. The adhesive was coated to a 25 micrometer thickness.

TABLE 3

| Example No. | % BDA (Wgt.) | Microsphere size ($\mu$) | Peel (N/dm) | Shear (min) |
|---|---|---|---|---|
| 11 | 0.1 | 58 | 84.0 | 7006+ |
| 12 | 0.5 | 48 | 97.9 | 7008+ |
| 13 | 1.0 | 58 | 72.6 | 7013+ |
| 14 | 2.0 | 65 | 29.5 | 7010+ |
| 15 | 4.0 | 40–60 | 22.0 | 5705 |
| 16 | 10.0 | 90 | 49.5 | 1392+ | as can be seen, the reduction in peel as BDA content rises about 1.0%.

In the following examples, the HDDA content of the matrix is varied. The matrix contains a 90/10 ratio of IOA/AA, 0.025 phr Irgacure TM 651, and variable amounts of HDDA as indicted in Table III. The pressure-sensitive adhesive contained 32 volume % elastomeric microspheres, 17 to 23$\mu$ in diameter. The adhesive was coated to a thickness of 75 micrometers. The BDA level described in Table 4 is that of the microspheres.

TABLE 4

| Example No. | BDA (%) | PEEL VALUES (N/dm) @ 90 in./min. HDDA (phr) | | | |
|---|---|---|---|---|---|
| | | 0.11 | 0.055 | 0.0275 | 0.0 |
| 20 | 0.0 | 42.6 | 53.0 | 63.0 | 35.8 |
| 21 | 0.025 | 45.5 | 42.8 | 8.7 | 41.4 |
| 22 | 0.05 | 33.8 | 30.7 | 33.0 | 46.1 |
| 23 | 0.10 | 44.1 | 46.0 | 25.2 | 47.9 |
| 24 | 0.5 | 32.7 | 39.9 | 40.5 | 43.5 |
| 25 | 1.0 | 33.3 | 32.4 | 36.4 | 39.6 |

The following examples include formulations which use only HDDA for crosslinking of the matrix and monomer inside the microsphere, causing formation of the IPN within the boundaries of the microsphere. The matrix has an IOA/AA ratio of 90/10, and including 0.25 phr Irgacure TM 651, and from 0 to 0.55 phr HDDA. The matrix contains 32 volume % IOA microspheres having an initial average diameter 17 to 23$\mu$. The microspheres were provided in a dispersion of the matrix monomers. The adhesive thickness was 75 microns. The BDA content in Table 5 refers to the microspheres.

TABLE 5

| Ex. No. | BDA Content % | Peel (N/dm) Peak | Peel (N/dm) Valley | Shear Average | Shear (min) |
|---|---|---|---|---|---|
| 26 | 0.0 | 191 | 143 | 152 | 10,000+ |
| 27 | 0.025 | 199 | 130 | 171 | 10,000+ |
| 28 | 0.05 | 126 | 99.5 | 104 | 10,000+ |
| 29 | 0.10 | 119 | 114 | 113 | 10,000+ |
| 30 | 0.50 | 122 | 83.4 | 97.5 | 10,000+ |
| 31 | 1.0 | 124 | 68.4 | 69.9 | 10,000+ |

The following examples show formulations using IOA/AmA type microspheres. These microspheres have no added crosslinker. The matrix contained IOA/AA in a 90/10 ratio, as well as 0.01 phr HDDA, 0.10 phr Irgacure TM 651 and 0.16 phr of a halomethyl substituted chromophore-s-triazine according to U.S. Pat. Nos. 4,329,384, and 4,330,590, (Vesley). The matrix monomers were blended with IOA/AmA microspheres in a 10% IOA dispersion. The microspheres had an initial average diameter of 17.0$\mu$ to provide the indicted volume % loadings.

TABLE 6

| Example No. | Microsphere Composition % crosslinker | Loading (wgt %) | Peel (N/dm) | Shear (min) | Tack (g) |
|---|---|---|---|---|---|
| 32 | 0% | 20 | 113 | 10,000+ | 852 |
| 33 | 0% | 32 | 74.8 | 385 | 945 |
| 34 | 0% | 44 | 128 | 2,877 | 976 |
| 35 | 0.025% | 20 | 48.6 | 10,000+ | 1006 |
| 36 | 0.025% | 32 | 52.2 | 10,000+ | 1149 |
| 37 | 0.025% | 44 | 62.6 | 10,000+ | 1032 |
| 35** | | | | | 987 |
| 36** | | | | | 862 |
| 37** | | | | | 942 |

*1 sec. dwell time, withdrawal rate 1 cm/sec., 100 g load. av. of 10 replicates.
**Repeat tack test above using 0.5 sec. dwell time 0.5 cm/sec withdrawal speed, 100 g load When measured under similar conditions, a commercially available transparent office tape has a tack value of 350 g.

The following examples demonstrate formulations using microspheres which contain Ebecryl TM 230 and/or 270 as polymeric crosslinking agents in amounts to correspond to BDU levels. The matrix formulation was IOA/AA ratio of 90/10, also containing 0.055 phr HDDA and 0.25 phr Irgacure TM 651. All adhesive formulations contained 32 volume % microspheres, and all were 75 microns thick.

TABLE 7

| Example No. | Ebecryl | M.S. Composition mole % ($\times 10^4$) | 90° Peel (N/dm.) | Shear (min.) |
|---|---|---|---|---|
| 38 | 270[1] | 1.36 | 129.6 | 2,550 |
| 39 | | 2.72 | 94.6 | 10,000+ |
| 40 | | 5.43 | 81.6 | 10,000+ |
| 41 | | 27.2 | 71.2 | 4,949 |
| 42 | 230[2] | 1.36 | 79.6 | 10,000+ |
| 43 | | 2.72 | 82.9 | 4,983 |
| 44 | | 5.43 | 84.0 | 8,750 |
| 45 | | 27.2 | 80.0 | 10,000 |

[1] A polyurethane diacrylate having a molecular weight of 1500, available commercially from RadCure Specialties.
[2] A polyurethane diacrylate having a molecular weight of 5000, available commercially from RadCure Specialties.

The following examples show formulations using dissimilar monomers for the matrix and the microspheres as described in Table X, the matrices also contained 0.28 phr Irgacure ™ 651, and 0.06 phr HDDA. All formulations contained 8% w/w of indicated microspheres.

TABLE 8

Peel Adhesion

| Example No. | Matrix | | Microspheres* | Peel Adhesion (N/dm) |
|---|---|---|---|---|
| 46 | IOA/AA | 8.75/12.5 | LMA/AmA/BDA | 71.4 |
| 47 | IOA/AA | 87.5/12.5 | INA/AmA/BDA | 33.8 |
| 48 | IOA/AA | 87.5/12.5 | IOA/AmA/BDA | 75.8 |
| 49 | IOA/AA | 87.5/12.5 | MBA/AmA/BDA | 47.5 |
| 50 | INA/AA | 90/10 | INA/AmA/BDA | 86.7 |
| 51 | INA/AA | 87.5/12.5 | INA/AmA/BDA | 97.2 |

*all compositions were 97.5/2/0.5

What is claimed is:

1. A pressure-sensitive adhesive comprising i) a matrix comprising a pressure-sensitive acrylate polymer, and ii) swellable, infusible, insoluble, elastomeric acrylate microspheres, each of said microspheres having discrete boundaries, said microspheres and said matrix forming an interpenetrating polymer network within the boundaries of said microspheres.

2. The pressure-sensitive adhesive of claim 1 wherein a majority of said microspheres have diameters of from about 1 micron to about 300 microns.

3. The pressure-sensitive adhesive of claim 1 wherein a majority of said microspheres are tacky.

4. The pressure-sensitive adhesive of claim 1 wherein a majority of said microspheres are nontacky.

5. The pressure-sensitive adhesive of claim 1 wherein a majority of said microspheres contain at least one interior void having a diameter of at least about 10% of the diameter of said microsphere, said void being at least partially filled with said matrix.

6. The pressure-sensitive adhesive of claim 5 wherein a majority of said microspheres contain at least one interior void having a diameter of at least about 30% of the diameter of said microsphere.

7. The pressure-sensitive adhesive of claim 1 wherein said microspheres comprise an acrylate polymer having a glass transition temperature of no greater than about $-20°$ C.

8. The pressure-sensitive adhesive of claim 7 wherein said microspheres comprising:
   a) at least about 85 parts of at least one alkyl acrylate ester of nontertiary alcohol, wherein the alkyl group contains from about 4 to about 14 carbon atoms, and
   b) correspondingly, up at about 15 parts of at least one polar monomer.

9. The pressure-sensitive adhesive of claim 8 wherein the alkyl acrylate is selected from the group consisting of isooctyl acrylate, 2-ethyl hexyl acrylate, isononyl acrylate, isoamyl acrylate and butyl acrylate.

10. The pressure-sensitive adhesive of claim 8 wherein the polar monomer is selected from the group consisting of acrylate acid, methacrylic acid, itaconic acid, crotonic acid, maleic acid, fumaric acid, and salts thereof.

11. The pressure-sensitive adhesive of claim 1 wherein said matrix comprises an acrylate polymer having a glass transition temperature of no greater than about $-20°$ C.

12. The pressure-sensitive adhesive of claim 7 wherein said microspheres comprise:
   a) at least about 70 parts of at least one alkyl acrylate ester of nontertiary alcohol, wherein the alkyl group contains from about 4 to about 14 carbon atoms, and
   b) correspondingly, up at about 30 parts of at least one polar monomer.

13. The pressure-sensitive adhesive of claim 1 further comprising a photoinitiator.

14. The pressure-sensitive adhesive of claim 1 further comprising a crosslinking agent.

15. The pressure-sensitive adhesive tape comprising the adhesive of claim 1 and a backing therefor.

16. The pressure-sensitive adhesive tape of claim 15 wherein said backing is releasably attached.

17. The pressure-sensitive adhesive tape of claim 15 wherein further comprising an additional layer.

* * * * *

UNITED STATES PATENT AND TRADEMARK OFFICE
CERTIFICATE OF CORRECTION

PATENT NO. : 5,266,402
DATED : November 30, 1993
INVENTOR(S) : Delgado et al.

It is certified that error appears in the above-indentified patent and that said Letters Patent is hereby corrected as shown below:

Col. 12, line 23      "indicted" should be --indicated--

Col. 13, Table 8      Example No. 46, "8.75/12.5" should be --87.5/12.5--

Signed and Sealed this

Third Day of May, 1994

Attest:

BRUCE LEHMAN

Attesting Officer     Commissioner of Patents and Trademarks